United States Patent

[11] 3,529,551

[72] Inventors Ricardo J. Barbero
 Cumberland;
 William Robert Lowstuter, La Vale,
 Maryland
[21] Appl. No. 23,850
[22] Filed April 21, 1960
[45] Patented Sept. 22, 1970
[73] Assignee Hercules Incorporated,
 a corporation of Delaware

[54] ROCKET PROPELLANT
 5 Claims, 7 Drawing Figs.
[52] U.S. Cl. ...................................... 102/101
[51] Int. Cl. ........................................ F42b 1/04
[50] Field of Search ......................... 102/98, 49,
 39, 28; 60/35.6RS; 102/38; 52/.5

[56] References Cited
 UNITED STATES PATENTS

| | | | |
|---|---|---|---|
| 552,919 | 1/1896 | Maxuim | 102/98 |
| 694,295 | 2/1902 | Maxuim | 102/38X |
| 2,114,214 | 4/1938 | Damblanc | 102/49X |
| 2,320,243 | 5/1943 | Mackey | 102/98 |
| 2,681,619 | 6/1954 | Chandler | 60/35.6 |
| 2,978,308 | 4/1961 | Keller | 102/98 |
| 3,023,570 | 3/1962 | Crouch | 60/35.6 |

FOREIGN PATENTS

| | | | |
|---|---|---|---|
| 85,376 | 2/1955 | Norway | 102/98X |
| 596,300 | 4/1934 | Germany | 60/35.6 |
| 598,235 | 7/1934 | Germany | 60/35.6 |
| 807,499 | 1/1959 | Great Britain | 102/98X |

OTHER REFERENCES
"A Quasi-Morphological Approach to the Geometry of Charges for Solid Propellant Rockets," reprint from Jet Propulsion, February 1965, copyright 1956 by the American Rocket Society, Inc., p. 103 required.

Primary Examiner—Robert F. Stahl
Attorney—Ernest G. Peterson

---

1. An end burning solid propellant especially adapted for use in a rocket motor essentially comprising a cast solid, longitudinal, cylindrical body of propellant containing a longitudinal, preformed rod disposed along the longitudinal axis thereof, said rod comprising a plurality of alternate sections of predetermined and accurately dimensioned solid and single perforated propellant to attain predetermined burning characteristics.

DETAIL OF CEMENTED CONTROL ROD MANUFACTURE   FIG. 6

DETAIL OF THE GRAIN AFTER CASTING   FIG. 7

PRESSURE VS. TIME TRACE OF GRAIN A

RICARDO J. BARBERO
WILLIAM ROBERT LOWSTUTER
INVENTORS

BY Ernest G. Peterson
AGENT

RICARDO J. BARBERO
WILLIAM ROBERT LOWSTUTER
INVENTORS

BY Ernest G. Peterson

AGENT

ROCKET PROPELLANT

This invention relates generally to rocket propellants and more particularly to a method of providing a controlled increase of the rate of burning for solid rocket propellant and to solid rocket propellant grains having additional burning surface area.

More explicitly in consideration of its outstanding aspects, this invention essentially provides a means of increasing the effective burning rate of a solid propellant by providing a burning surface that is greater than the normal cross-sectional area of the solid propellant. Also, it permits the use of propellant compositions that have other desirable characteristics but do not have the burning rate desired for certain applications. Additionally, it is well known that the performance requirements of a rocket coupled with the selection of suitable propellant composition determines the proper geometrical shape of the charge. However, the geometry of the rocket charge often becomes quite complex from a design and manufacturing viewpoint when utilizing established technology. With the present invention, it is possible to use much simpler geometry to obtain a multiplicity of desired burning characteristics.

In consideration of established technology, a variety of methods other than basic propellant formulation has been proposed in an attempt to obtain solid rocket propellant grains having an increased burning rate. The most successful of these attempts has been to embed metal wires in the solid propellant during manufacture of the grain. It is theorized that the heat carried along the wire preheats the propellant immediately surrounding the wire, thereby raising its burning rate. As the propellant burns, a cone is formed with its apex at the wire. Other methods have involved the use of pyrotechnic strands of high burning rate, and the incorporation of small pieces of high rate compositions, etc. With the exception of wires, none of these attempts has been entirely successful.

Wired end burning grains have been under active research and development for some years with a series of limited objective test flights on record. However, the use of wires for burning rate control imposes several serious limitations on the rocket designer and upon the manufacturer of the propellant grain. Since the burning rate is believed to depend upon the heat transfer characteristics of the wire, an extensive period of research and development is necessary to fit the wire to the specific propellant for every burning rate change. The wire composition, wire diameter, wire coatings and the way the wire is processed and handled all become factors in the performance of the rocket. The wire must be carefully processed by cleaning, etching and coating so that it will be bonded to the propellant. It must be handled carefully so as to maintain the chemical character of the coating. Contaminates such as perspiration, oils and dust affect the bond between wire and propellant. The wires are very fine for optimum usefulness, about 10 mils in diameter. Hence they are weak, easily kinked, and generally difficult to handle in a rocket chamber prior to casting of the solid propellant grain. Because rockets are used, and are expected to be used the world over, they must be capable of storage, handling and firing under a wide range of temperatures from −65°F. to +165°F. The plastic solid propellants have coefficients of thermal expansion considerably higher than metals. As a consequence, changes in temperature cause changes in the relative lengths of the wires and the propellant surrounding them. The resultant strains at the interface often cause rupture of the bond between wire and propellant. This can allow rocket gases to penetrate the grain structure in an uncontrolled manner to cause failure of the system. An additional deficiency of the wired propellant grains is that the presence of the wire causes a degradation of the burning rate temperature coefficient. It is believed that the rate of heat transmission down the wire and across the wire-propellant interface into the propellant matrix is much lower at reduced temperatures and higher at elevated temperatures. The result is an excessive decrease in burning rate as the temperature of the grain is lowered and an excessive increase in burning rate as the conditioning temperature is raised. The overall net effect is one of large variation of performance with temperature.

In contrast to the use of wires for increasing burning rate, we have discovered a novel and improved technique which we refer to as Controlled Void technique. The Controlled Void technique in accordance with our invention introduces no foreign materials requiring tedious and expensive treating and handling techniques, there are no problems of bonding materials dissimilar in physical and chemical properties, and the burning characteristics of the propellant remain the same with or without the Controlled Void rate control system.

Furthermore, the Controlled Void technique makes it possible to increase the effective burning rate of end burning solid rocket propellant grains or bodies thereof by any desired amount. Still further, it allows localized increases in effective burning rate in any part of a solid rocket propellant in order to achieve specific desired effects, such as the elimination of slivers, the opening of ports to achieve thrust termination, or the production of slots to increase burning surface. The technique also makes it possible for the designer to vary the ballistics of solid propellant rocket to achieve neutral, regressive, progressive or combinations of these performance characteristics in an integral grain.

In solid rocket propellants normal burning rate ranges lie between 0.1 inch per second to about 1 inch per second. Occasionally, rates slightly below 0.1 inch/second can be obtained by operating at very low pressures and rates slightly above 1 inch/second by operating at very high pressures (2,000 to 3,000 p.s.i.). Specifications for rockets to burn for extended lengths of time (60 to 500 sec.) often require rates very much lower than 0.1 inch/second for radially burning grain designs and very much above 1 inch/second for end burning grain designs. Frequently burning rates of 3 to 6 inches/second would be necessary. The Controlled Void technique makes it possible to achieve such high rates and gives the rocket designer a new latitude of ballistic control not previously available.

Generally described, the Controlled Void technique in accordance with our invention is based on the exact placement of predetermined accurately dimensioned voids in the matrix of a solid rocket propellant in a precise manner. In the case of end burning grains the voids are placed generally in longitudinal lines. A single line of voids or a plurality of lines of voids may be used, and these may be positioned longitudinally or transversely depending on the particular characteristics desired. Special void shapes can be placed to reduce slivers or to increase burning surface in any section of a solid propellant grain. More specifically, in accordance with the present invention there is provided a method for the production of a solid body of propellant, especially adapted for use in a rocket motor, in which the improvement comprises forming a plurality of intermittent and substantially uniform voids within the solid body of propellant to attain predetermined burning characteristics. Additionally there is provided a novel solid propellant grain containing the plurality of intermittent and substantially uniform voids therein. The valuable contribution afforded by the invention will be appreciated further as the specification proceeds and with reference to the accompanying drawings wherein reference symbols refer to like parts wherever they occur and wherein:

FIG. 6 illustrates a completed control rod in accordance with the invention made up of the solid plugs and perforated sticks depicted in FIG. 5; and FIG. 7 illustrates in section a propellant grain in accordance with the invention having a control rod such as depicted in FIG. 6 positioned along its axis.

Figure 1:
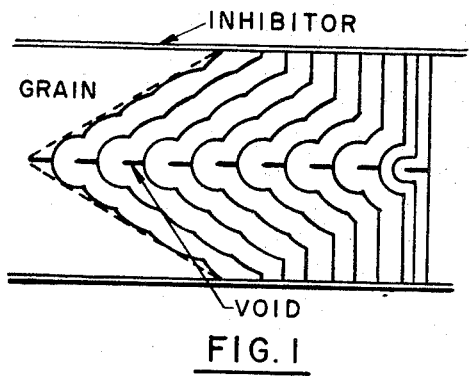
FIG. 1 is a diagrammatic representation showing the equilibrium cone of an end burning grain of propellant having a single line of voids positioned along its axis.
Figure 2:
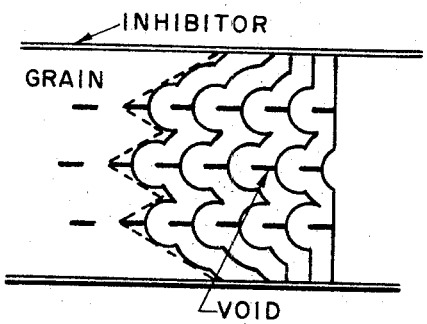
FIG. 2 is a diagrammatic representation showing the equilibrium cone of an end burning grain of propellant having a plurality of lines of voids positioned along and about its axis.

In an end burning grain, as the flame front opens a void, it travels the length of the void, thereby producing a short radially burning section. This action advances the flame front the length of the void. The radially burning surface being short (a fraction of an inch to several inches long) is wiped out before reaching the chamber wall by the advancing flame front of the end burning grain. As the burning action proceeds, the successive opening of voids and the subsequent advancement of the flame front results in the formation of a stepped cone with the void line at its apex. FIG. 1 shows diagrammatically the shape of the equilibrium cone and the voids which produced it. FIG. 2 shows diagrammatically the shape of the equilibrium cones produced by a plurality of lines of voids. The primary advantage of multiple voids lines is the reduction in the overall depth of the cones.

From the foregoing diagrammatic representations, it will be appreciated that the action of the voids produces an increase in the area of the burning surface. This surface burns at its normal rate for the pressure and grain temperature regardless of the dimensions of the voids or the shape of the cone. Keeping the distance between the voids constant, deeper cones are produced by longer voids. This results in an increase in the cone depth and therefore an increase in exposed surface area. Also by keeping the void length constant and decreasing the distance separating the voids, the depth of the cone is increased because the voids are opened more rapidly and there are more voids in a given length of grain. Therefore, the rate at which the apex of the cones progresses down the length of the grain (the effective burning rate of the system) is dependent upon the length of the substantially uniform voids and the distance separating them. When these are equal, the effective burning rate of the propellant is doubled over the normal rate of the propellant operating under identical pressure and grain temperature conditions.

It is known that the performance of a rocket is dependent upon the mass rate of discharge of the propellant ($\dot{m}$). One of the functions for determining the mass rate of discharge is the product of the burning rate ($r$), the area of the burning ($S$), and the density of the propellant ($\rho$). $\dot{m} = Sr\rho$. From this equation it will be seen that the mass rate of discharge of an end burning grain with the Controlled Void equilibrium cone can be calculated by using the total surface of the cones ($S_c$) in the above equation and using the normal burning rate of the propellant $r$. The same value is obtained by using the flat cross-section face of the end burner without Controlled Void ($S_n$) and multiplying it by the effective rate of the advancement of the cone ($R$). Hence; $S_c r \rho = S_n R \rho$. Because it is tedious to calculate the surface of the equilibrium cones, the expression $S_n R \rho$ is used in all calculations of ballistic performance. Although the Controlled Void system is actually a method of controlling the area of the burning surface, because of practical considerations, it is treated as a method of burning rate control in the case of end burning grains. In some applications such as in the elimination of slivers and the formation of slots in a propellant grain Controlled Void is treated in its true sense as a means of controlling the burning surface.

The calculation for the design of a Controlled Void grain is extremely simple. The performance specifications of the rocket motor establish the necessary mass rate of discharge ($\dot{m}$). $\dot{m} = S_n R \rho$ where $S_n$ = the cross section area of the grain, $R$ = the effective burning rate required, and $\rho$ = the density of the propellant. Therefore, $R = \dot{m}/S_n \rho$ = the effective burning rate. To calculate the dimensions of the Controlled Void, the following procedure is used:

Nomenclature:
  $R$ = Effective burning rate of system, in./sec.
  $r$ = Propellant burning rate at $P_c$, in./sec.
  $k$ = Specific flame velocity down the Void, in./sec.
  $L_V$ = Void length, in.
  $L_S$ = Separating distance, in.

The times required for the flame to advance through $L_V$ and $L_S$ are:

$$T_V = \frac{L_V}{k} \quad (1) \text{ and } T_S = \frac{L_S}{r} \quad (2)$$

$$T_T = T_V + T_S = \frac{L_V}{k} + \frac{L_S}{r} \quad (3)$$

The "effective" burning rate of the system would be $$R = \frac{L_V + L_S}{T_V + T_S} \quad (4)$$

Substituting (1) and (2) in (4)

$$R = \frac{L_V + L_S}{\frac{L_V}{k} + \frac{L_S}{r}} \quad (5)$$

or $$\frac{L_V}{L_S} = \frac{\frac{R}{r} - 1}{1 - \frac{R}{k}}$$

But because $k$ approaches $\infty$ $$R = r \left( \frac{L_V + L_S}{L_S} \right) = r \left( \frac{L_V}{L_S} + 1 \right)$$

and $$\frac{L_V}{L_S} = \left( \frac{R}{r} - 1 \right)$$

Example 1

To get an effective burning rate of 1.5 inch/second when the normal burning rate of the propellant is 0.8 in./sec.

$$\frac{L_V}{L_S} = \frac{1.5}{.8} - 1 = 0.875$$

Setting $L_S$ at .25 inch $$L_V = 0.875 \times .25 = .22 \text{ inch}$$

Example 2

To have a burning rate of 3 inches/second when $L_S = .25$ inch and $r = .8$ in./sec.

$$L_V = L_S \left( \frac{3}{.8} - 1 \right) = .69 \text{ inch}$$

In the Controlled Void system using a control rod as hereinafter more fully described, and in selecting the composition of the propellant used in the control rod, the burning rate vs. pressure relationship must be considered. Ideally the burning rate of the control rod propellant should match exactly that of the matrix propellant at the particular pressure at which the system is to operate. Control rod burning rates can be slightly higher or lower than the matrix propellant without materially affecting the performance of the system. The ratio of void length and separating distance can be regulated to compensate for small burning rate differences. Control rod burning rates above that of matrix propellant will improve the effectiveness of the rate increase function of the system. Control rod burning rates below that of the matrix propellant degrade the effectiveness of the rate increase function. If the control rod rates are too much below the rate of the matrix propellant, the system will not provide a rate increase and the grain will act as a flat end burner.

The formation of the Voids in the propellant grain structure can be accomplished in numerous ways. Furthermore, the term "Void" as used herein is meant to include an empty or unfilled space in the usual sense as well as an inert or filled space of material which functions as a void. For example, inert plastic pieces can be positioned in the mold or motor chamber by stringing them bead fashion on a thread, and the propellant grain cast around them. A significant difference in the coefficients of thermal expansion between the plastic beads and the matrix propellant should be present. Upon cooling from cure temperature to conditioning temperature, the beads shrink and become loose in the propellant pocket. When the flame front opens the pocket, the loose plastic bead is ejected leaving the Void. Another method of void formation is to embed hollow plastic spheres or other shaped objects during casting. This plastic can be one which will bond to and become physically a part of the matrix propellant. In this case a true void is obtained. Materials other than plastics can be used to form the voids. For example, hollow metal objects can form the voids.

Voids can be formed by boring a longitudinal hole in the propellant grain and cementing propellant plugs machined from propellant in the holes at predetermined distances. Plastic separators can be used between plugs if desired. Still another way of producing the voids is by making a grain made up of slices of propellant. Alternate slices would have a hole provided in them. The slices are then cemented together and placed in the motor chamber and fired as such, or the composite could be put in a mold and the grain cast around them. Likewise, slices of propellant can have cups machined in them and the cups cemented together to form a grain. These cups can be formed by compression molding. The preferred method of producing the voids for end burning rocket propellant grains is by using a control rod as heretofore mentioned. In this technique, pieces are cut from solid and monoperforated, also known as single perforated, solid propellant stick powder. Stick powder ⅜" in diameter is satisfactory. A ⅛" perforation has proven adequate for most applications. Such pieces can be made by machining propellant plugs or by direct casting methods. For some low pressure designs calling for long voids, a larger diameter is necessary to maintain the proper local port to throat ratios in the voids. The cut pieces of stick powder are cemented together with a suitable cement or are cohered by a solvation process. The completed control rod or rods are supported in the mold or chamber and the propellant cast, cured, and processed in the usual manner. In the double base propellant system the control rod surface is solvated to some degree by the casting solvent, thereby making an integral unit of the rod and matrix propellant. Upon radiographic examination the voids show up clearly and exactly as planned. Beyond the usual avoidance of rough handling of any propellant composition, no special handling precautions appear to be necessary for the control rods. Standard production machines can be used by regular plant personnel in making the pieces and assembling the control rods. Moreover, the pieces forming the control rods may be made in various shapes, such as cubes, prisms, spheres, cylinders, etc.

Figure 5:
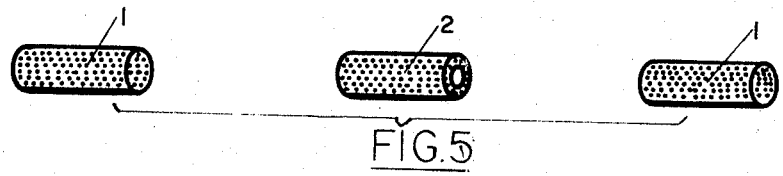
FIG. 5 illustrates the cut extruded solid plugs and single perforated stick powders which in combination are used in making control rods according to the invention.
Figure 3:
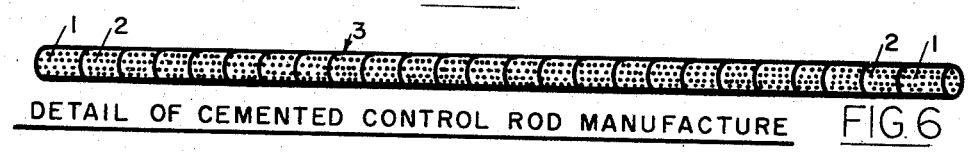
FIG. 3 shows the pressure and thrust trace obtained by burning a grain of the type defined for FIG. 1.
Figure 3:
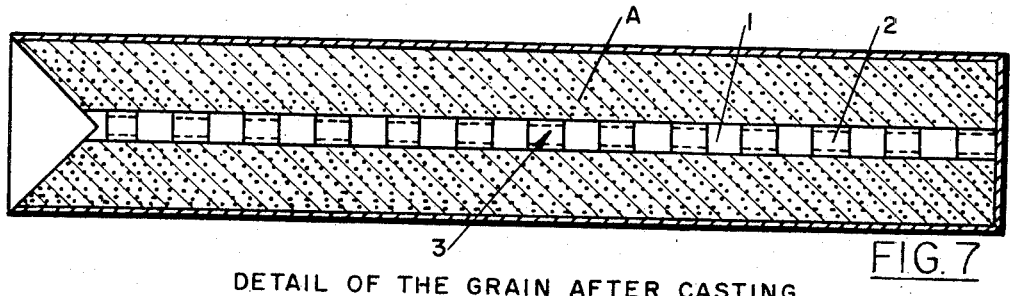
Figure 3:
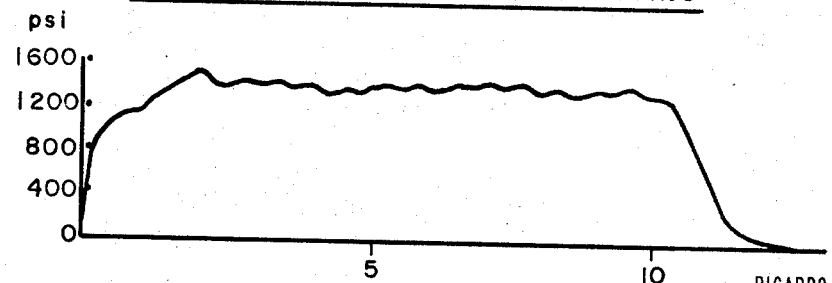

FIG. 5 illustrates the Controlled Void technique schematically showing the cut extruded solid plugs one and monoperforated stick powders 2 which make up the completed control rod 3 as illustrated in FIG. 6, its position in the propellant grain A as illustrated in FIG. 7 and the pressure vs. time trace of the firing test of this grain as shown in FIG. 3. The waves of the pressure trace record the opening of each void.

Figure 4:
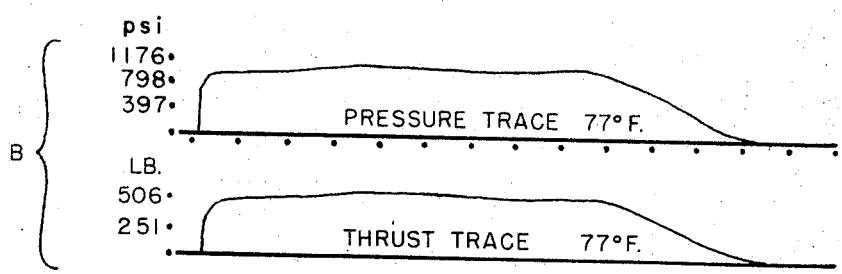
FIG. 4 shows the pressure and thrust traces obtained by burning four additional grains B through E similar to but of larger diameter than that of FIG. 1.
Figure 4:
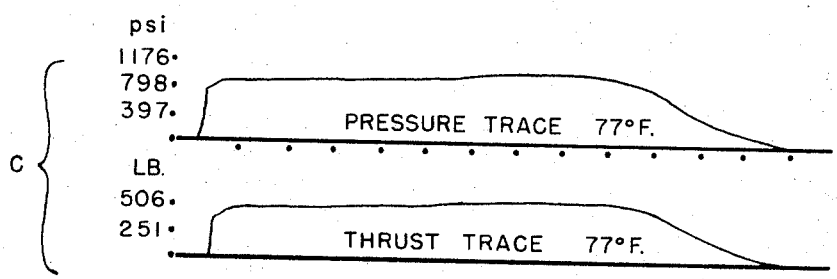
Figure 4:
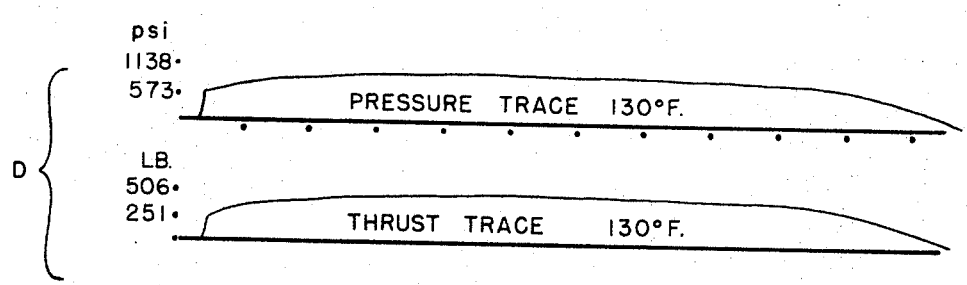
Figure 4:
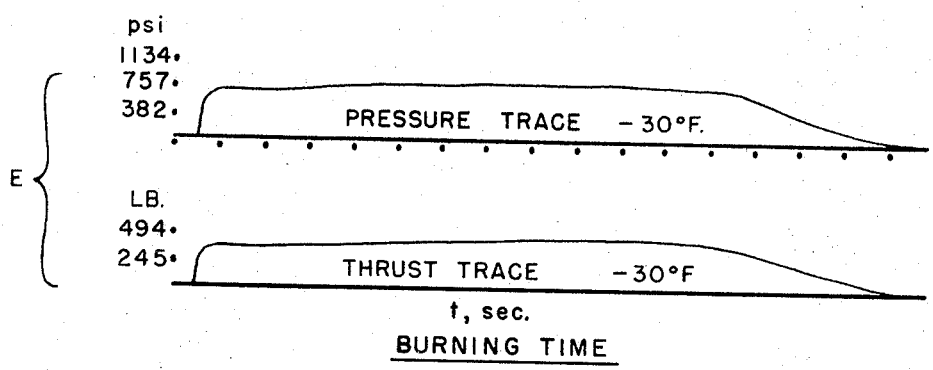

FIG. 4 shows the pressure and thrust traces of four additional grains 6" in diameter and designated B, C, D and E. These traces are smooth because the additional surface provided by each void was kept small in relation to the total surface in order to avoid raising the pressure a significant amount. In each of the above examples the control rod was made to double the normal burning rate of the ARP double base propellant at the pressure of operation. M−7 stick powder ⅜" in diameter with a ⅛" perforation and ⅜" diameter solid ARP propellant rod were cut into ½" lengths control rods made by cementing alternate pieces of M−7 stick and ARP rod together. The control rods were tied into the 3" diameter for A and the 6" diameter for B, C, D and E 18" long molds. Casting powder for ARP propellant was then loaded covering the control rod in each mold. The addition of casting solvent and subsequent processing, conditioning to firing temperature, and static test firings were carried out in the conventional manner.

Data from the five firings are shown in Table I.

TABLE I.—CONTROL VOID STATIC TEST FIRINGS WITH ARP PROPELLANT

| Grain | Grain Diameter (in.) | Grain Length (in.) | Cone Angle (degrees) | Conditions Temp. (° F.) | Conditions Time (hrs.) | Avg. Pressure (p.s.i.a.) | Avg. Thrust (lb. ft.) | Normal Burning Rate (in./sec.) | Effec. Burning Rate (in./sec.) | Burning Time (sec.) |
|---|---|---|---|---|---|---|---|---|---|---|
| A | 3 | 18 | 74 | 77 | 24 | 1,324 | 116 | .84 | 1.61 | 10.5 |
| B | 6 | 18.3 | 60 | 77 | 36 | 1,138 | 498 | .82 | 1.41 | 9.2 |
| C | 6 | 18.3 | 60 | 77 | 36 | 1,116 | 490 | .81 | 1.37 | 9.5 |
| D | 6 | 18.3 | 60 | 130 | 36 | 1,118 | 498 | .84 | 1.38 | 9.4 |
| E | 6 | 18.3 | 60 | −30 | 36 | 879 | 365 | .68 | 1.10 | 11.9 |

These representative firings show that this particular system is reproducible and reliable. The temperature coefficient of burning rate calculation for the last four static rounds of the controlled void system is 0.133 percent per degree Fahrenheit. The temperature coefficent calculated over the same range for similar ARP grains with 10 mil copper wire was 0.33 percent per degree Fahrenheit. The value of 0.133 percent per degree Fahrenheit is in the range of temperature coefficients given for ARP propellant at similar pressures. This factor is a great improvement over wired grains.

The propellant compositions for the examples are readily available double base propellants. M−7 is a finished extruded stick powder which can be obtained as such. ARP is a cast double base propellant prepared from solid casting powder and a casting solvent. The compositions of the three ingredients are given in Table II.

TABLE II

ARP Propellant Composition and Physical Properties

| Grain Composition | | Casting Powder Composition | |
|---|---|---|---|
| Component | Formula by Wt. | Component | Formula |
| NC (12.6%) | 50.8 | NC (12.6%) | 75.0 |
| NG | 35.7 | NG | 17.0 |
| TA | 7.8 | PbSal | 3.0 |
| PbSal | 2.0 | LBR | 3.0 |
| LBR | 2.0 | NDPA | 2.0 |
| NDPA | 1.7 | Carbolac I (added) | 0.3 |
| Carbolac I (added) | 0.2 | Graphite (glaze) | 0.05 |
| T.V. | 0.60 | T.V. | 0.83 |

| Solvent Composition | |
|---|---|
| Component | Formula |
| NG | 75.0 |
| TA | 24.0 |
| NDPA | 1.0 |

Powder / Solvent = 67.7 / 32.3

Cure Time: 6 days.
Cure Temperature: 140° F.
Temp. Coeff.: 0.14 (percent/° F.) at 1,200 p.s.i.a.
Density: 0.058 lb./in.³

TABLE II—Continued

M-7 Propellant Composition, Extruded Double-Base Propellant for Rocket Use

| Composition | | |
|---|---|---|
| Component | Formula by Wt. | |
| NC (13.15%) | 54.6 | Density 0.061 lb./in.³ |
| NG | 35.5 | |
| Ethyl Centralite | 0.9 | |
| Potassium Perchlorate | 7.8 | |
| Carbon Black | 1.2 | |

With reference to the above formulations, it will be appreciated that the invention may be carried out in conjunction with any type of self-sustaining gas-generating composition. However, such compositions will preferably utilize smokeless powder base; for example, the compositions may consist of nitrocellulose or may be formed from mixtures of nitrocellulose with a liquid explosive polyhydric alcohol such as nitroglycerin, nitroglycol and the like, or the charges may be formed from compositions having a nitrocellulose base and containing particles of a solid inorganic oxidizing salt. Examples of such inorganic salts are barium nitrate, potassium nitrate, potassium sulfate, ammonium nitrate, ammonium perchlorate, sodium perchlorate, potassium chlorate, lead peroxide, tin dioxide, lead stearate and the like, and mixtures thereof. The compositions may also contain particles of metal that will modify the burning rate of the propellant, such as powdered tin, aluminum, lead and the like.

From the foregoing it will be seen that the advantages of the invention are multifold in that:

The Control Void system in accordance with our invention opens up a new dimension of grain design possibility to the rocket engineer. He can provide additional burning surface of any desired shape and dimension in the body of a solid rocket propellant grain. This new capability enlarges the usefulness of end burning grains, making it possible to design a wide variety of performance characteristics into a single grain. For example, the latest requirements for rockets call for a maximum propellant loading into specified space envelopes. An end burning grain cast directly into the motor chamber against a tapered insulation achieves this goal. However, such a grain has progressive pressure and thrust relationships with time because a progressively larger burning face is formed as the grain burns. By using the Controlled Void design, an increased rate can be provided for the initial burning phase decreasing gradually as the diameter of the grain gives increased burning surface area. The result is a neutral thrust vs. time relationship. Under the same adverse grain geometry other systems in use (embedded wires) are not suited to gradual rate adjustment.

Another advantage in end burner design is the ability to obtain large differences in effective burning rate in a single propellant grain. Multiple thrust rockets of simple reliable designs are possible. Effective burning rates of several inches per second can be provided in the initial burning section followed by abrupt or gradual changes in thrust to some lower level. The sustain portion of such a grain can be designed to provide a declining thrust to give a constant acceleration or velocity to a missile as the weight decreases with propellant consumption. Wired grains do not have this versatility. The Control Void system also permits a precise adjustment of burning rate of end burning grains. Merely by calculation, using well established propellant performance data, an exact burning rate can be obtained. With wired grains a tedious expensive period of experimentation must be carried out with the hope of achieving a rate within a range which can be tolerated.

Still another advantage will be appreciated from the following. The solution of most rocket design problems starts with the establishment of the ballistic design of the propellant grain. The grain dimensions are dictated by the space envelope available, and the mass discharge by the performance specifications. The designer must then find a propellant which will meet the requirements. Often these requirements can be met only by resorting to extreme pressures so as to have high burning rates. This condition in turn imposes extreme conditions on the hardware and insulation components. By the use of the Controlled Void technique high burning rates can be obtained and the performance specifications met at reduced pressures with a resultant savings in inert weight, and complexity of hardware design.

Still further, the Control Void system is practically foolproof in design, manufacture, and in operation. No elaborate precautions are required in any part of the manufacturing procedure. No new manufacturing techniques need to be developed or learned. All materials used are readily available in adequate supply and no materials new or foreign to a propellant grain manufacture are required. The Controlled Void system does not change or degrade in any way the chemical or physical properties of the propellant grain. No new hazards are introduced to the system. The temperature cycling, handling qualities and storage capabilities of the propellant remain unchanged. The temperature and pressure coefficients and other ballistic characteristics of the propellant are unchanged. In contrast the presence of wires introduces foreign materials, giving limitations in manufacture, storage, cycling and handling procedures. The bond between the wire and propellant can fail, leading to malfunction of the system. The wires also cause changes in the temperature and pressure coefficient of the propellants, and in general the properties of the propellant are usually degraded.

It will be seen, therefore, that this invention may be carried out by the use of various modifications and changes without departing from its spirit and scope with only such limitations placed thereon as are imposed by the appended claims.

We claim:

1. An end burning solid propellant especially adapted for use in a rocket motor essentially comprising a cast solid, longitudinal, cylindrical body of propellant containing a longitudinal, preformed rod disposed along the longitudinal axis thereof, said rod comprising a plurality of alternate sections of predetermined and accurately dimensioned solid and single perforated propellant to attain predetermined burning characteristics.

2. An end burning solid propellant especially adapted for use in a rocket motor essentially comprising a cast solid, longitudinal, cylindrical body of propellant containing a plurality of longitudinal, preformed rods disposed longitudinally therein and transversely spaced, each of said rods comprising a plurality of alternate sections of predetermined and accurately dimensioned solid and single perforated propellant to attain predetermined burning characteristics.

3. An end burning solid propellant especially adapted for use in a rocket motor essentially comprising a cast solid, longitudinal, cylindrical body of propellant having a plurality of individually embedded inert elements therein, said inert elements adapted to be individually ejected leaving individual voids as the propellant burns and said inert elements being individually spaced from each other and accurately dimensioned to attain predetermined burning characteristics.

4. An end burning solid propellant according to claim 3 wherein the inert elements are plastic beads.

5. An end burning solid propellant according to claim 3 wherein the inert elements are hollow plastic spheres.